United States Patent [19]

Ciciora

[11] Patent Number: 4,458,268
[45] Date of Patent: Jul. 3, 1984

[54] SYNC DISPLACEMENT SCRAMBLING
[75] Inventor: Walter Ciciora, Park Ridge, Ill.
[73] Assignee: Zenith Radio Corporation, Glenview, Ill.
[21] Appl. No.: 338,464
[22] Filed: Jan. 8, 1982
[51] Int. Cl.³ ............................................. H04N 7/16
[52] U.S. Cl. ..................................... 358/120; 358/119
[58] Field of Search ................................. 358/119, 120
[56] References Cited
U.S. PATENT DOCUMENTS

| | | | |
|---|---|---|---|
| 3,460,161 | 8/1969 | Waller et al. | 358/120 |
| 3,485,941 | 12/1969 | Bass | 358/120 |
| 3,530,232 | 9/1970 | Reiter et al. | 358/120 |
| 4,333,107 | 6/1982 | McGuire et al. | 358/120 |
| 4,390,898 | 6/1983 | Bond et al. | 358/120 |

FOREIGN PATENT DOCUMENTS 1907580  8/1970  Fed. Rep. of Germany ...... 358/120

Primary Examiner—S. C. Buczinski

[57] ABSTRACT

A subscription television system comprises means for broadcasting a scrambled television signal wherein the NTSC horizontal and vertical synchronization signals are displaced in time from their nominal positions. Each authorized system subscriber is provided with a decoder adapted for restoring the synchronization signals to their nominal positions to enable unscrambling of the broadcast programs for viewing. The synchronizing signals may be time displaced in a static manner or the time displacement may be dynamically varied as a function of time.

11 Claims, 16 Drawing Figures

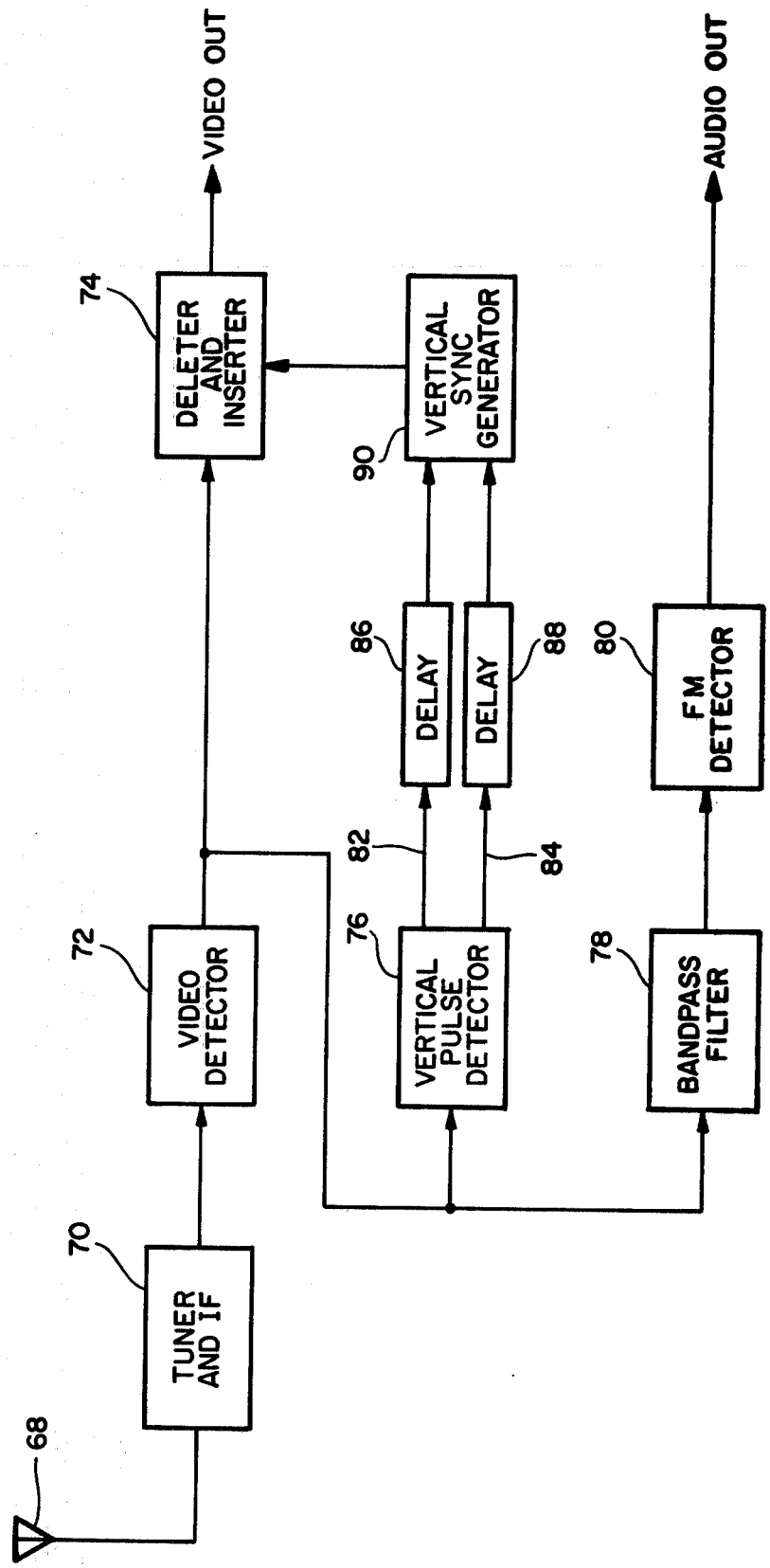

SYNC DISPLACEMENT SCRAMBLING

BACKGROUND OF THE INVENTION

The present invention relates generally to television signal transmission and receiving systems and, more particularly, to a system wherein the synchronization components of a conventional NTSC television signal are displaced in time rendering the resulting format particularly useful in subscription and multi-channel cable television applications.

In subscription television systems television programming signals are typically transmitted, either "over-the-air" or through a suitable cable network, in a scrambled form rendering the broadcast video information largely unviewable when received by a conventional television receiver. In order to supply an unscrambled video display to the system subscribers, each subscriber is provided with a suitable decoder operable for unscrambling the broadcast signals and for coupling the unscrambled signals to a conventional television receiver for viewing. Security is, of course, a prime consideration in the design of such systems. That is, the scrambling technique employed should be of a nature making the unauthorized decoding of the broadcasts extremely difficult in order to deter the would-be pirate. At the same time, the scrambling technique must accommodate reliable decoding by authorized system subscribers.

In this connection, subscription television systems typically employ one or both of two general techniques for scrambling the video information of a broadcast television signal. One of these techniques involves the inversion of the video signal occuring during selected horizontal scanning lines of the broadcast television signal and the subsequent re-inversion thereof by a suitable decoder or unscrambler connected to a television receiver. The other scrambling technique in widespread use is that of sync suppression. Suppression of the horizontal and/or vertical synchronization components of a broadcast television signal below the average video level will cause the deflection circuits of a normal television receiver to behave erratically such that a scrambled video image is produced on the display screen of the receiver. In addition, the ability of the television receiver to use the color reference burst associated with the horizontal synchronization signals is severely degraded thereby causing inaccurate color reproduction. Unfortunately, most currently known systems employing either video inversion or sync suppression scrambling techniques are relatively insecure in that unauthorized or pirated decoders keyed to unscramble the video broadcasts are relatively easy to design and manufacture.

It is therefore a basic object of the present invention to provide an improved scrambling technique for use in a television transmission and receiving system. It is a more specific object of the invention to provide a subscription television transmission and receiving system using a highly secure scrambling technique adapted for detering the unauthorized decoding of scrambled video broadcasts. These and other objects are accomplished according to the invention by interchanging the positions of a video signal patch and the horizontal synchronization component of a standard NTSC television signal to produce a time displaced horizontal synchronization signal. Alternatively, or in combination therewith, the standard vertical synchronization component is replaced with a relatively wide time displaced vertical synchronization pulse with the remainder of the associated vertical interval being maintained at a white level. The standard horizontal and vertical synchronization components are restored by suitable decoders to enable an authorized subscriber to unscramble the broadcast programs for viewing.

BRIEF DESCRIPTION OF THE DRAWINGS

The features of this invention which are believed to be novel are set forth with particularity in the appended claims. The invention, together with its objects and the advantages thereof, may best be understood by reference to the following description taken in conjunction with the accompanying drawings, in which like reference numerals identify like elements in the several figures and in which:

FIG. 4 is a block diagram of a television receiver adapted for re-establishing proper vertical synchronization information in a received television signal having statically displaced vertical synchronization signals;

DESCRIPTION OF THE PREFERRED EMBODIMENT

Figure 1A:
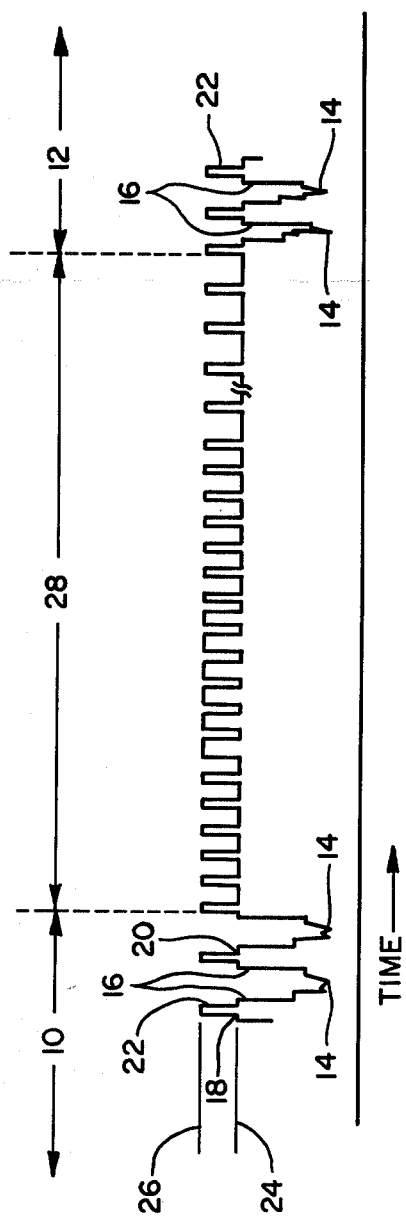
FIGS. 1A and 1B illustrate conventional NTSC television signals including horizontal and vertical blanking and synchronizing information.
Figure 1B:
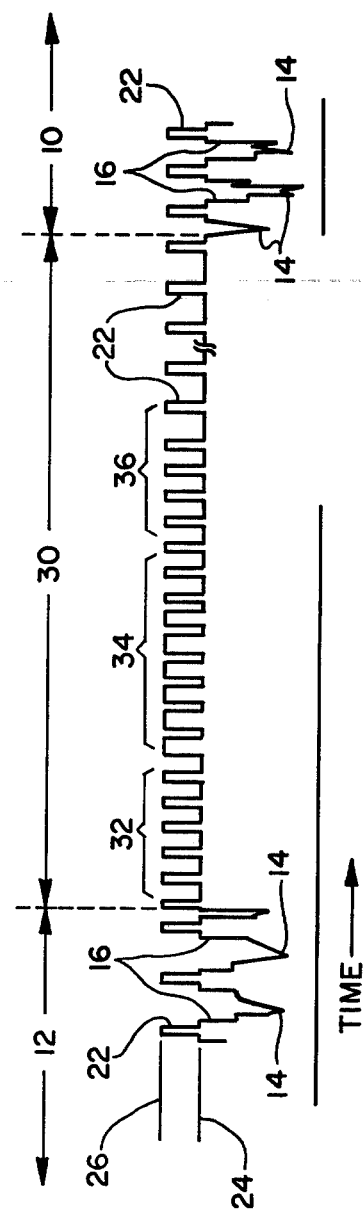

To facilitate a better understanding of the present invention, FIGS. 1A and 1B illustrate two consecutive fields of a baseband composite video signal in accordance with NTSC standards, reference numeral 10 identifying an even field and reference numeral 12 an odd field. Each of the fields 10 and 12 comprises a plurality of horizontal trace lines forming a video signal 14, the trace lines being separated by a series of horizontal blanking pulses 16. Each horizontal blanking pulse 16 includes a front porch 18, a back porch 20 and carries a horizontal synchronizing pulse 22, front and back porches 18 and 20 having an amplitude representing a black or blanking level 24 with the horizontal synchronizing pulses 22 extending to a so-called "blacker than black" level 26. The fields 10 and 12 of horizontal scanning lines 14 are separated by vertical blanking intervals 28 and 30, each of the vertical blanking intervals comprising a plurality of horizontal scanning lines containing vertical synchronization information in the form of a first series of equalizing pulses 32, a serrated vertical synchronization pulse 34 and a second series of equalizing pulses 36, the pulses 32, 34 and 36 being mounted on a pedestal at black or blanking level 24. In addition, a number of horizontal synchronization pulses 22 follow equalization pulses 36 before the beginning of the next video field. A single NTSC video frame consists of 483 active horizontal scanning lines so that each of the fields 10 and 12 comprises 241.5 horizontal lines with each of the vertical blanking intervals 28 and 30 consisting of 21 horizontal scanning lines.

As is well known, the horizontal synchronizing pulses 22 are used for synchronizing the horizontal deflection system of a television receiver while the vertical synchronization information contained in the vertical intervals 28 and 30 is used to synchronize the receiver's vertical deflection system. More specifically, at the beginning of each field 10 or 12 the electron beam or beams of the receiver is horizontally deflected across the screen of the receiver while being amplitude modulated in accordance with the video signal 14. At the end of the horizontal line, the upcoming synchronization pulse 22 initiates a rapid horizontal retrace which is blanked from view because of the level of the associated horizontal blanking pulse 16. This horizontal trace and retrace action is continuously repeated as the electron beams are slowly deflected in a downward direction by the vertical deflection system until a complete field of horizontal scanning lines have been traced across the entire screen. At this time, the synchronization information contained within the upcoming vertical interval initiates a rapid vertical retrace to the top of the screen, which vertical retrace is also blanked from view because the pedestal of the vertical interval is at blanking level 24. At this time, another field of horizontal scanning lines is traced on the screen so as to interleave with the horizontal lines of the previous field thereby producing a complete video frame. Twenty or more of the horizontal scanning lines of each field are typically not displayed on the viewing screen since most television receivers are overscanned from 10 to 20 percent.

In accordance with the present invention, either or both of the vertical and horizontal synchronizing signals are displaced from their nominal positions shown in FIGS. 1A and 1B in order to produce a scrambled video signal adapted for use in a subscription or cable television system or the like. The displacement of the synchronizing signals may either be static wherein the synchronizing signals are displaced from their nominal positions by fixed amounts or the displacement may be dynamic wherein the synchronizing signals are displaced from their nominal positions according to some time variable function. By suitably displacing the vertical synchronizing signals, the even and odd video fields can be selectively offset in a vertical direction relative to each other to produce vertical synchronization displacement scrambling. Horizontal synchronization displacement scrambling, achieved by suitably displacing the horizontal synchronizing signals, can, for example, have the effect of causing video information from two separate video lines to appear on one displayed horizontal line.

Figure 2:
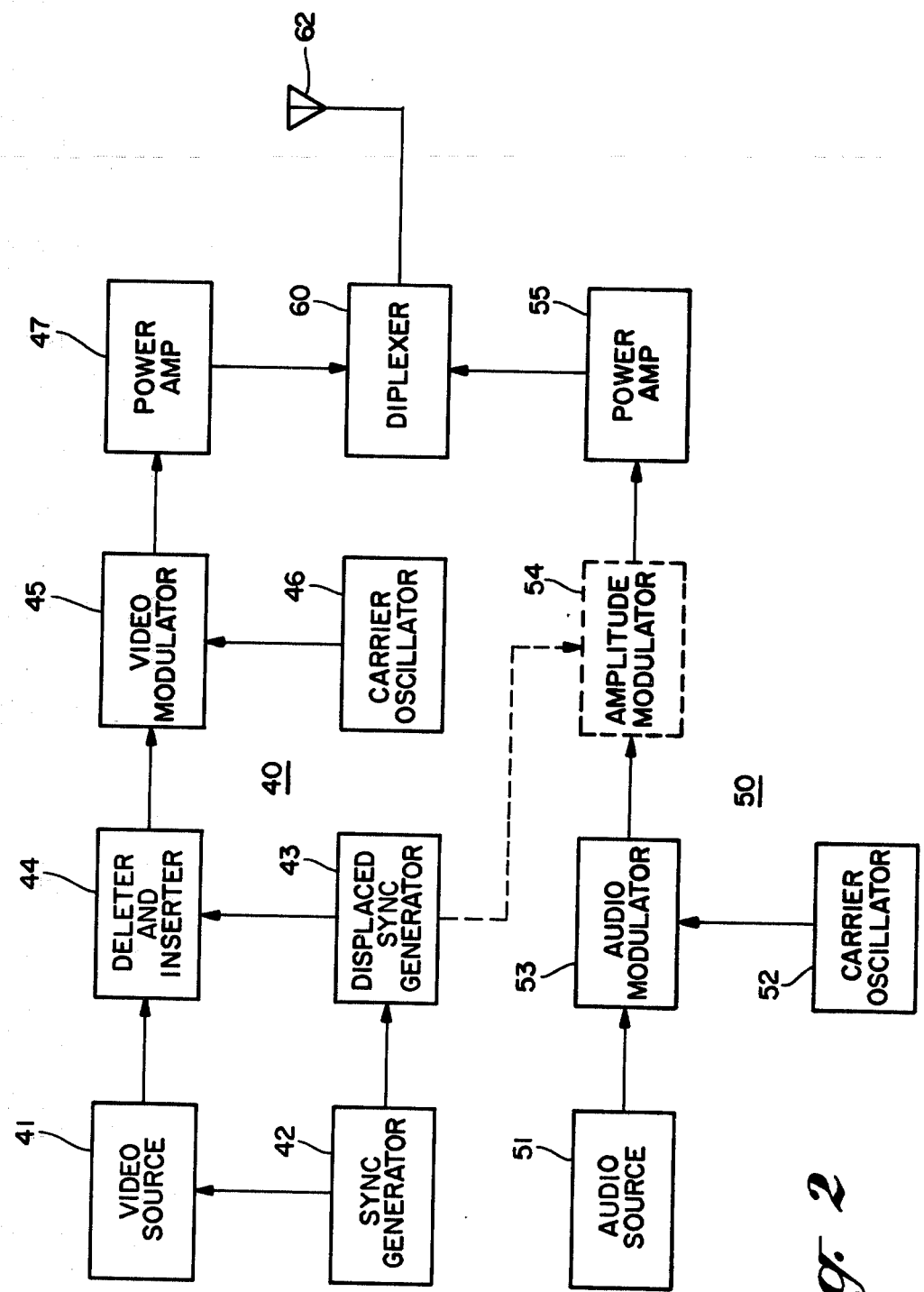
FIG. 2 is a block diagram showing a television signal transmitter constructed according to the invention for effecting vertical synchronization displacement scrambling.

A more detailed explanation of the invention will now be undertaken with initial reference to FIG. 2 which illustrates a television signal transmitter adapted for generating and transmitting a television signal including displaced vertical synchronizing signals according to the teachings of the invention. The transmitter, which is largely conventional in design, includes a video channel 40 and an audio channel 50. Video channel 40 comprises a video signal source 41 supplied by a conventional sync generator 42. Sync generator 42 also supplies a displaced vertical sync generator 43 whose output, together with the output of video source 41, is coupled to a deleter and inserter circuit 44. Deleter and inserter circuit 44 couples a composite baseband video signal to one input of a video modulator 45, the composite baseband video signal having displaced vertical synchronization components as will be described in more detail hereinafter. Video modulator 45 amplitude modulates the output of an RF carrier oscillator 46 with the composite baseband video signal, the resulting amplitude modulated signal being amplified by a power amplifier 47 and coupled through a conventional diplexer 60 for transmission via an antenna 62. Audio channel 50 includes a source of audio signals 51 and an RF carrier oscillator 52 both supplying an audio modulator 53. The output of audio modulator 53, which consists of the RF carrier developed by oscillator 52 frequency modulated by the output of audio source 51, is coupled through an amplitude modulator 54, amplified by a power amplifier 55 and coupled therefrom through diplexer 60 for transmission via antenna 62. As will be explained in further detail hereinafter, amplitude modulator 54 is responsive to displaced vertical sync generator 43 for impressing an AM keying signal on the FM audio signal reflecting the amount of vertical synchronization displacement when operating in a dynamic mode.

Figure 3A:
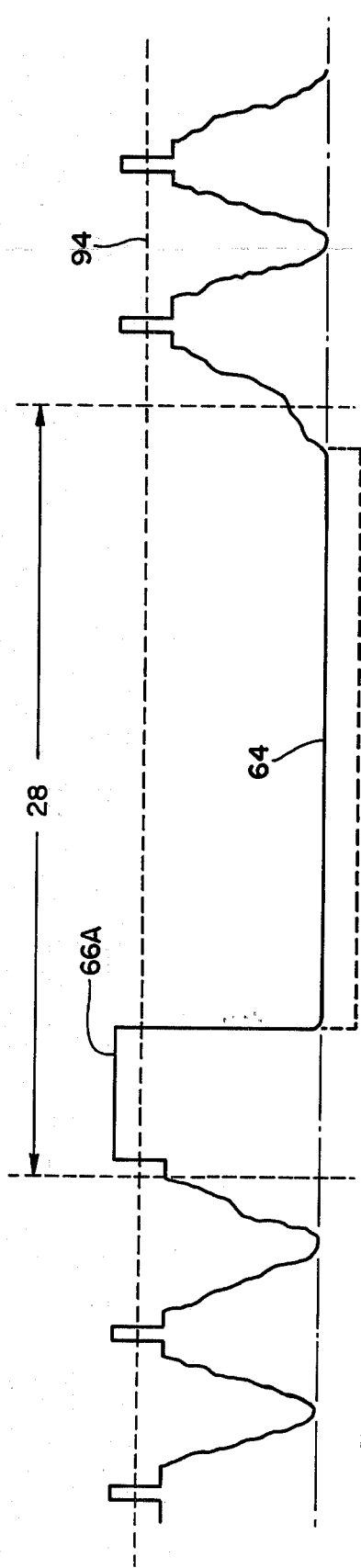
FIGS. 3A and 3B are graphical representations of displaced vertical synchronization signals produced by the transmitter of FIG. 2.
Figure 3B:
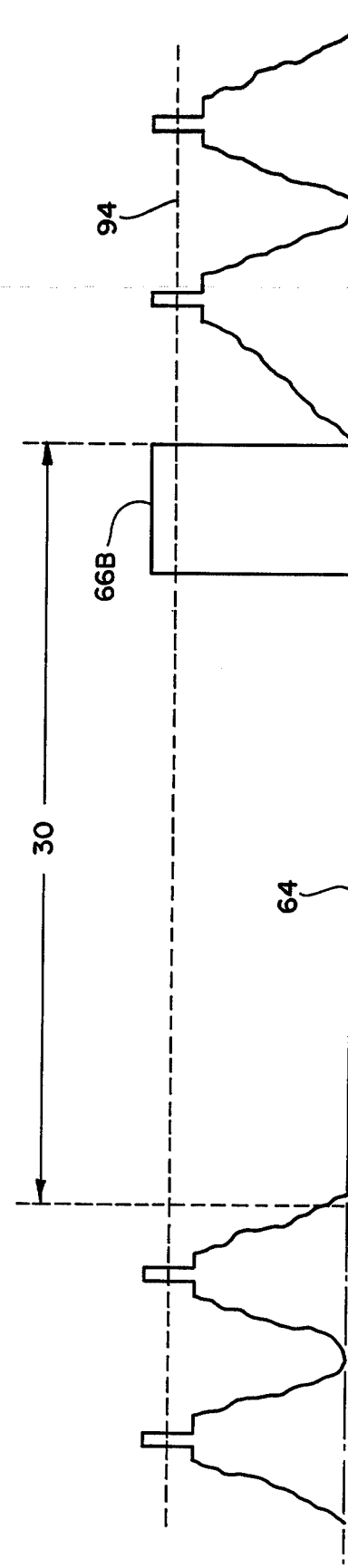

FIGS. 3A and 3B illustrate the static vertical synchronization displacement mode of operation of the invention. In this mode of operation, the deleter and inserter circuit 44 of FIG. 2 is operative for replacing the signals normally characterizing at least one of the vertical blanking intervals 28 and 30 of fields 10 and 12 with a single relatively wide, typically about three horizontal scanning lines, vertical synchronization pulse at a fixed position adapted for causing either premature or late vertical retrace, the remainder of the vertical interval being maintained at a white level 64. Thus, in FIG. 3A, the modified vertical blanking interval 28 includes a displaced vertical synchronization pulse 66A located at a fixed position near the beginning of the vertical interval for causing premature vertical retrace while the modified vertical blanking interval 30 (see FIG. 3B), includes a displaced vertical synchronization pulse 66B located at a fixed position at the end of the vertical interval adapted for causing late vertical retrace. The displaced vertical blanking pulses 66A and 66B could be located outside of the vertical intervals and occupy fixed positions defined by the overscanned horizontal trace lines. It will be appreciated that the vertical deflection system of a conventional television receiver will respond to the displaced vertical synchronization signals 66A and 66B by offsetting the consecutive interleaved video fields thereby producing a scrambled video image. The scrambling process is further enhanced by the fact that the remaining portions of the vertical intervals are maintained at white level 64 such that the reproduced video image will flicker at a 30 Hz rate at the top and bottom of the picture. Furthermore, since the original motivation for interlacing even and odd television fields was to reduce 30 Hz flicker, this motivation is frustrated by vertical sync displacemtnt scrambling. Thus, corresponding lines in even and odd fields are separated from each other and the flicker cancelling effect of their normal adjacency in defeated and they twinkle at a 30 Hz rate.

FIG. 4 illustrates a decoder useful in association with an authorized television receiver for re-establishing the nominal NTSC vertical synchronization signals in the vertical intervals of the signals of FIGS. 3A and 3B to unscramble the reproduced video image. The transmitted RF signals are received by an antenna 68 and coupled through a conventional tuner and IF stage 70 to a conventional video detector 72, the output of video detector 72 representing the video baseband signals illustrated in FIGS. 3A and 3B. The video baseband signals developed at the output of detector 72 are coupled to one input of a deleter and inserter circuit 74 and also to the input of a vertical pulse detector 76. The intercarrier audio signal components of the baseband television signal developed at the output of detector 72 are coupled through a 4.5 MHz bandpass filter 78 to an FM detector 80 which demodulates the 4.5 MHz intercarrier audio signal for developing an output audio baseband signal. Vertical pulse detector 76 includes a a first output 82 developing a pulse signal identifying the occurrence of each displaced vertical sync pulse 66A. A second output 84 of vertical pulse detector 76 develops an output pulse signal identifying the occurrence of each displaced vertical sync pulse 66B. Output 82 of vertical pulse detector 76 is coupled through a delay element 86 to one input of a vertical sync generator 90 while output 84 of vertical pulse detector 76 is coupled through a second delay element 88 to a second input of vertical sync generator 90. The delays characterizing delay elements 86 and 88 are selected such that the vertical sync generator 90 is properly operated in response to the vertical pulse identification signals developed on outputs 82 and 84 for coupling standard NTSC vertical synchronization signals to deleter and inserter 74 for replacing the modified vertical intervals illustrated in FIGS. 3A and 3B.

More particularly, delay element 86 is characterized by a time delay corresponding to the time duration between the occurrence of displaced vertical pulse 66A and the beginning of the vertical interval of the next corresponding video field. As a consequence, a pulse produced on output 82 of vertical pulse detector 76 identifying the occurrence of a displaced vertical pulse 66A results in a signal being developed at the output of delay element 86 at the beginning of the next corresponding video field. This signal is applied to vertical sync generator 90 which develops standard NTSC vertical synchronization signals for insertion into the vertical interval of this field. In an analagous manner, the time delay characterizing delay element 88 corresponds to the time duration between the occurrence of a displced vertical pulse 66B and the beginning of the vertical interval of the next corresponding video field. As a result, in response to the development of a displaced vertical pulse identification signal on output 84, delay element 88 causes vertical sync generator 90 to develop standard NTSC vertical synchronization signals at the beginning of the vertical interval of the next corresponding video field. As before, the standard NTSC vertical synchronization signals are coupled to deleter and inserter 74 for replacing the vertical interval signals of FIG. 3B.

Figure 5:
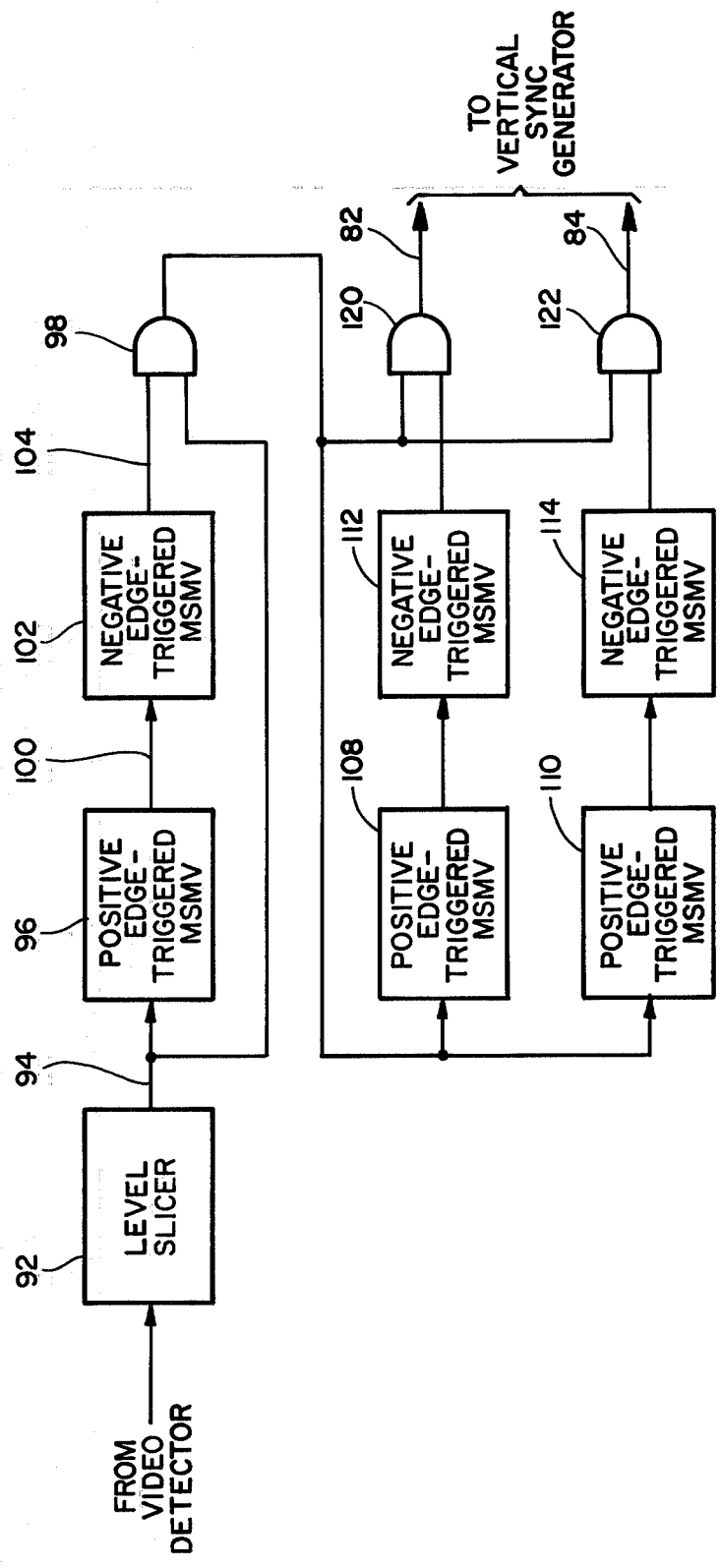
FIG. 5 is a block diagram of the vertical pulse detector of FIG. 4.
Figure 6:
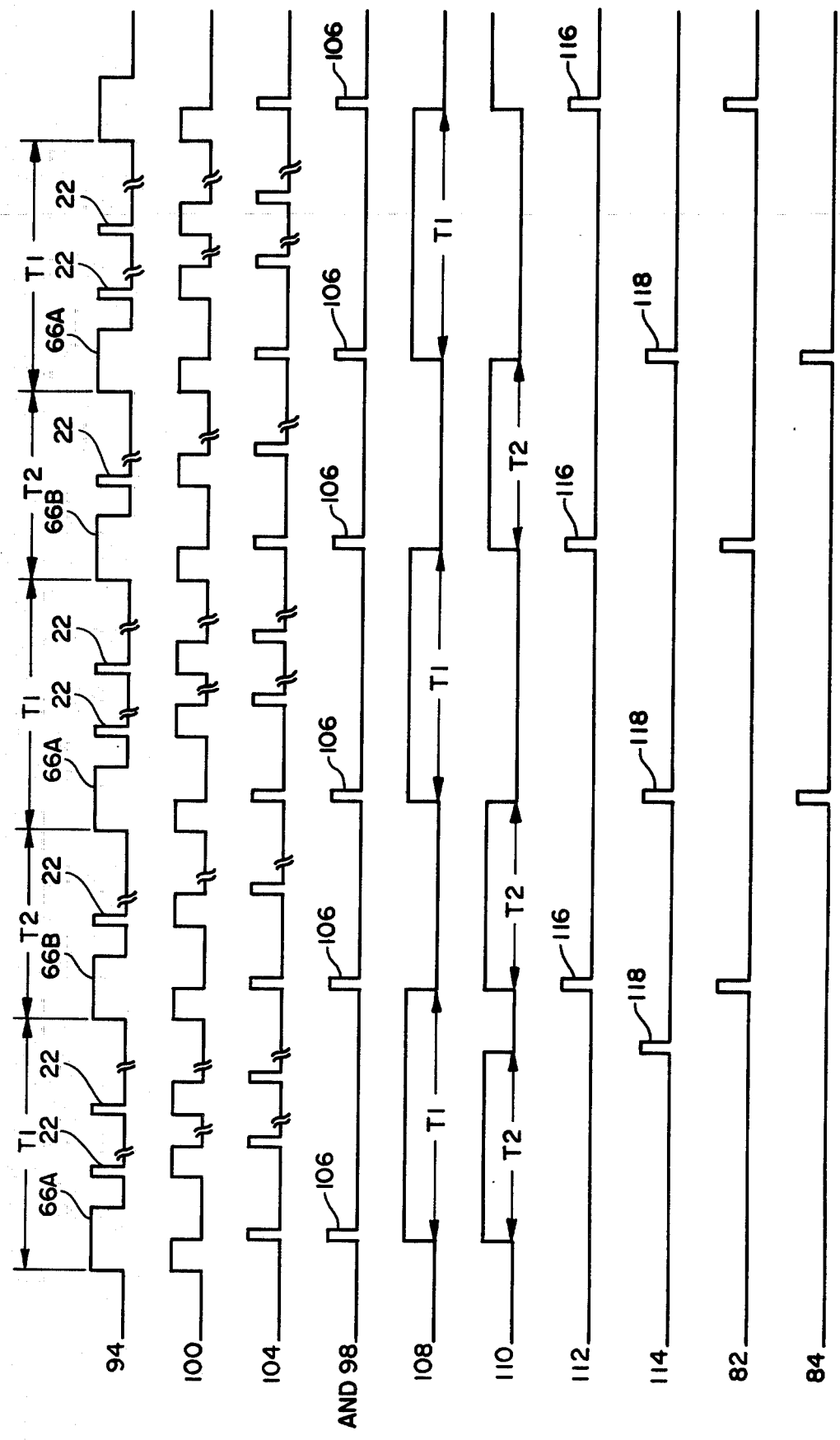
FIG. 6 is a waveform timing chart illustrating the temporal relationships of various signals characterizing the vertical pulse detector of FIG. 5.

FIG. 5 shows an embodiment of vertical pulse detector 76 and FIG. 6 is a timing diagram illustrating the operation of the vertical pulse detector. Referring to FIG. 5, a level slicer 92 is operative for sampling the output of video detector 72 at a level represented by dotted lines 94 of FIGS. 3A and 3B. A signal is therefore produced at the output 94 of level slicer 92 as represented by the first waveform of FIG. 6. It will be observed that this waveform consists of a series of displaced vertical pulses 66A and 66B together with a series of interposed horizontal synchronization pulses 22 (only a few of which are shown for purposes of clarity). It will also be observed that the displaced vertical pulses 66A and 66B define two alternately occurring time intervals T1 and T2, time interval T1 representing the relatively long time interval between the occurrence of a displaced vertical pulse 66A and the next occurring displaced vertical pulse 66B while time interval T2 represents the time interval between a displaced vertical pulse 66B and the next occurring displaced vertical pulse 66A. The signal developed on output 94 of level slicer 92 is coupled to an input of a positive edge triggered monostable multivibrator 96 and also to one input of an AND gate 98. The output 100 of multivibrator 96 is coupled to the input of a negative edge triggered monostable multivibrator 102 whose output 104 is coupled to the second input of AND gate 98. The unstable state characterizing multivibrator 96 is chosen to be at least as long as the width of a horizontal synchronization pulse 22 and, preferably, somewhat longer than this width. On the other hand, the unstable state characterizing multivibrator 102 is chosen such that its unstable state plus the unstable state of multivibrator 96 is less than the width of a displaced vertical pulse 66A and 66B. Referring to FIG. 6, a signal is consequently developed on output 100 of multivibrator 96 consisting of a series of pulses having positive going edges coinciding with the positive going edges of the displaced vertical pulses 66A and 66B and the horizontal synchronization pulses 22, the width of these pulses corresponding to the unstable state of multivibrator 96. Also, a signal is produced on output 104 of multivibrator 102 consisting of a sequence of pulses whose positive going edges coincide with the negative going edges of the pulses produced on the output 100 of multivibrator 96.

AND gate 98 is responsive to the signals developed on output 94 of level slicer 92 and output 104 of monostable multivibrator 102 for producing a sequence of pulses 106 each of which identifies the occurrence of a displaced vertical pulse 66A or 66B. That is, the pulses produced on output 104 of multivibrator 102 coincide in time with the displaced vertical pulses 66A and 66B but not with the horizontal synchronization pulses 22. The output of AND gate 98 is coupled to the inputs of a pair of positive edge triggered monostable multivibrators 108 and 110. The unstable state of multivibrator 108 corresponds to the time interval T1 while the unstable state of multivibrator 110 corresponds to the time interval T2. As a consequence, whenever multivibrator 108 is in a logic 0 state, it will be operated in response to the positive edge of a pulse 106 for assuming a logic 1 state for the time interval T1. Similarly, whenever multivibrator 110 is in a logic 0 state, it will be operated in response to the positive edge of a pulse 106 for assuming a logic 1 state for the time interval T2. The output of multivibrator 108 is coupled to a first negative edge triggered monostable multivibrator 112 while the output of multivibrator 110 is coupled to the input of a second negative edge triggered monostable multivibrator 114. The unstable states of multivibrators 112 and 114 are relatively short so that a sequence of relatively short duration pulses 116 is produced at the output of multivibrator 112 the positive edges of which coincide with the negative transitions of multivibrator 108. In a similar manner multivibrator 114 develops a sequence of output pulses 118 of relatively short duration, the positive going edges of pulses 118 coinciding with the negative transitions of multivibrator 110. The pulses 116 developed at the output of multivibrator 112 are applied to one input of an AND gate 120 the second input of which is supplied by the output of AND gate 98. The pulses 118 develop at the output of multivibrator 114 are applied to an input of a second AND gate 122 whose second input is also supplied with the output of AND gate 98. With reference to FIG. 6, it will be observed that each pulse 116 coinciding with a pulse 106 defines a displaced vertical pulse 66B while each pulse 118 coinciding with a pulse 106 defines a displaced vertical pulse 66A. As a consequence, the outputs of AND gates 120 and 122 consist of a series of interleaved pulses alternately defining displaced vertical pulses 66A and 66B and thereby represents outputs 82 and 84 of the vertical pulse detector 76.

Figure 7:
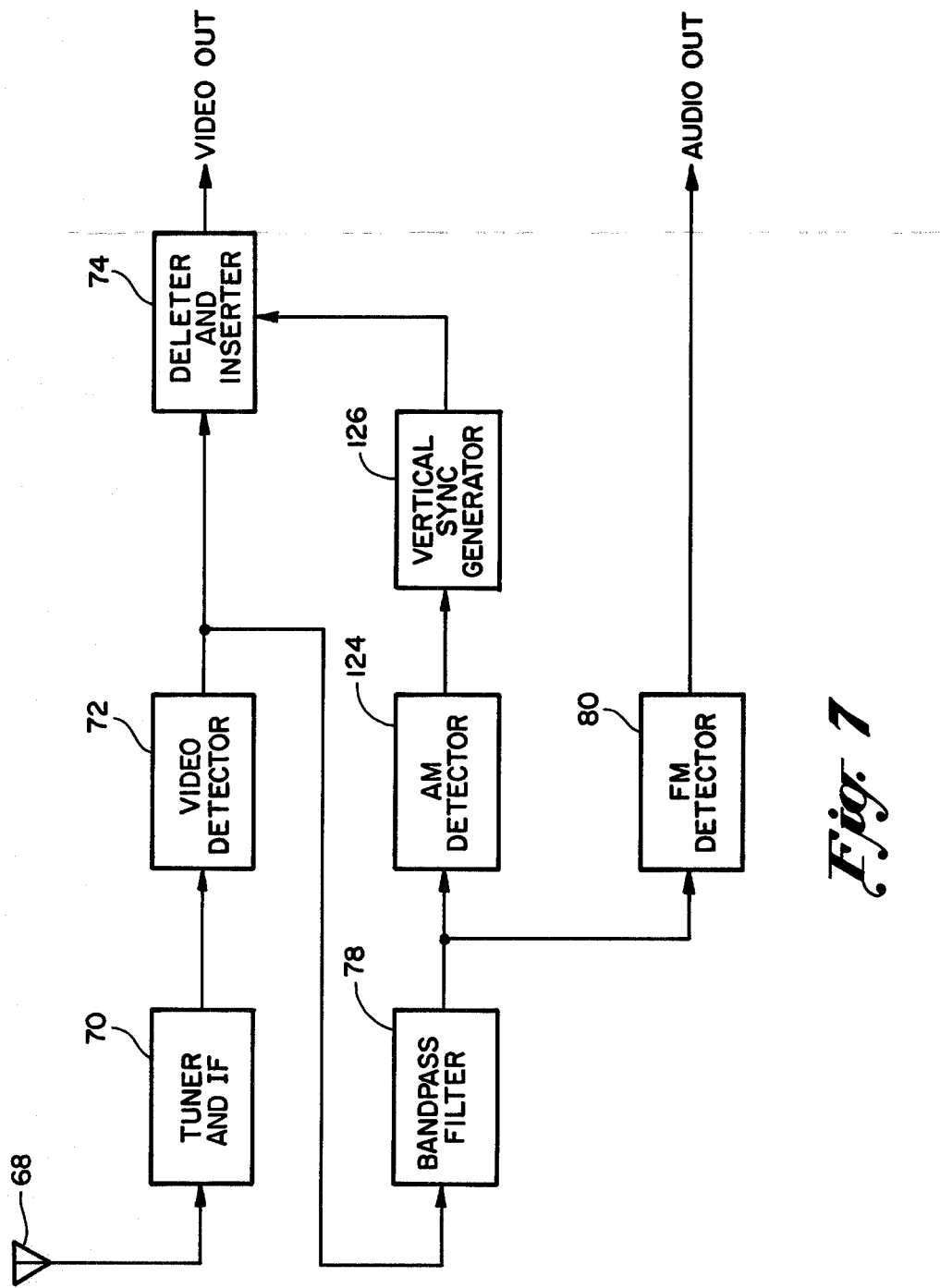
FIG. 7 is a block diagram of a television receiver adapted for re-establishing proper vertical synchronization information in a received television signal having dynamically displaced vertical synchronizing signals.

In the foregoing discussion, it has been assumed that the displaced vertical pulses 66A and 66B are fixed in their relative positions. However, and as previously mentioned, in order to provide for increased system security it may be desirable to continuously change the position of the displaced vertical pulses. In such a case, in order to re-establish the standard NTSC vertical synchronization signals it is necessary to transmit an ancilliary keying signal identifying the beginning of the vertical interval of each transmitted video field. The keying signal may be transmitted, for example, as amplitude modulation of the RF audio signal as illustrated in FIG. 2. As shown in FIG. 7, the keying signal may be recovered by an AM detector 124 which is responsive to the intercarrier sound signal. The keying signal developed at the output of AM detector 124 is then coupled for operating a vertical sync generator 126 which, in combination with deleter and inserter circuit 74, is effective for replacing the transmitted vertical intervals (including the dynamically changing displaced vertical pulses) with standard NTSC vertical synchronization signals. It will be appreciated that the consecutive fields reproduced by a conventional television receiver in response to the dynamically changing displaced vertical pulses will be vertically offset from each other in a dynamically and continuously changing manner thereby producing a highly effective scrambled picture.

Figure 8:
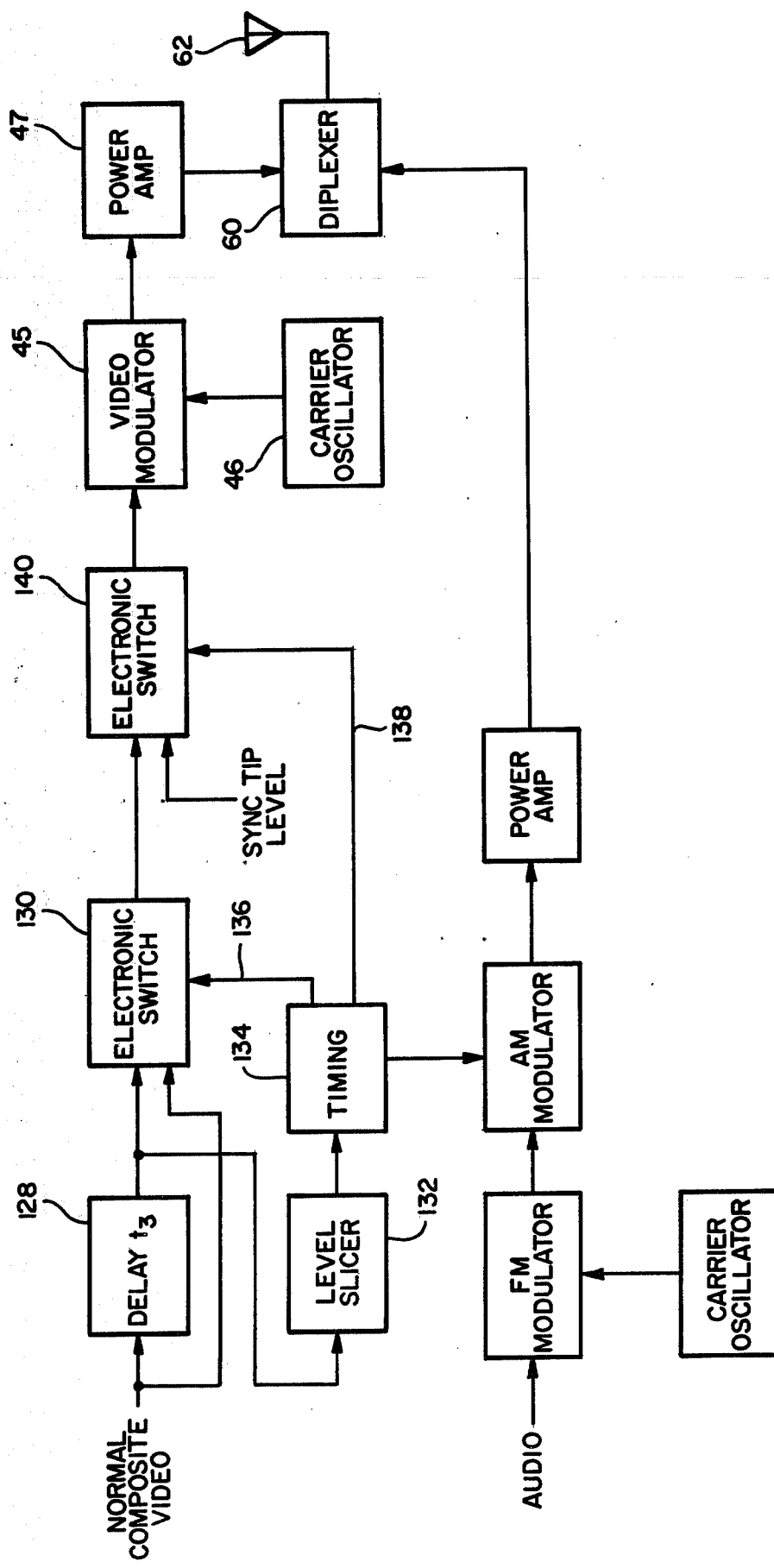
FIG. 8 is a block diagram showing a television signal transmitter constructed according to the invention for effecting horizontal synchronization displacement scrambling.
Figure 9:
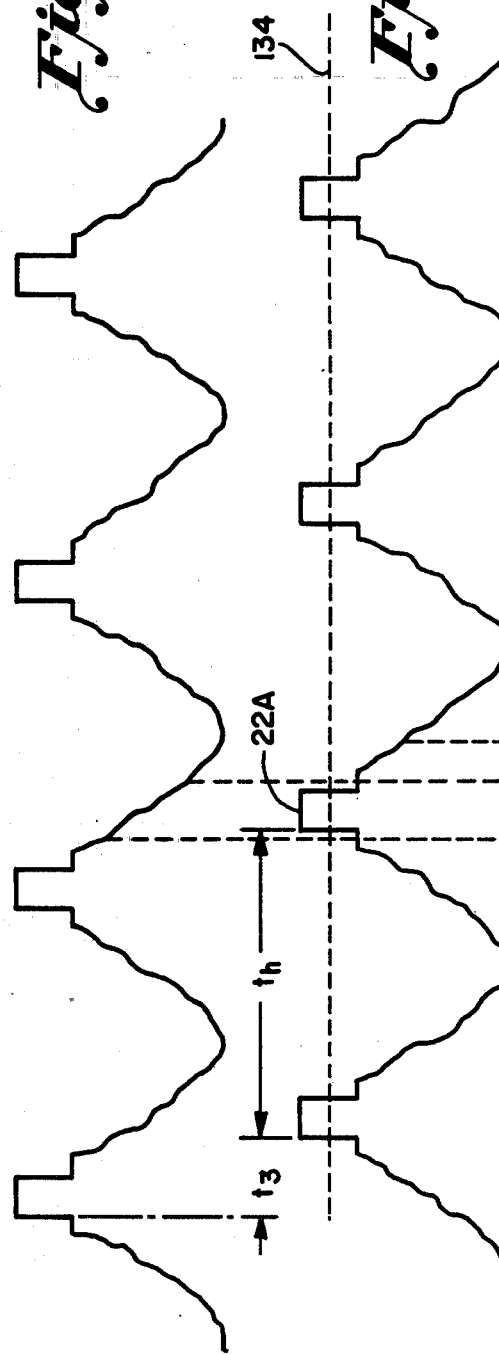
FIGS. 9A–9D depict various signal waveforms illustrating the horizontal synchronization displacement scrambling and unscrambling techniques of the invention.
Figure 10:
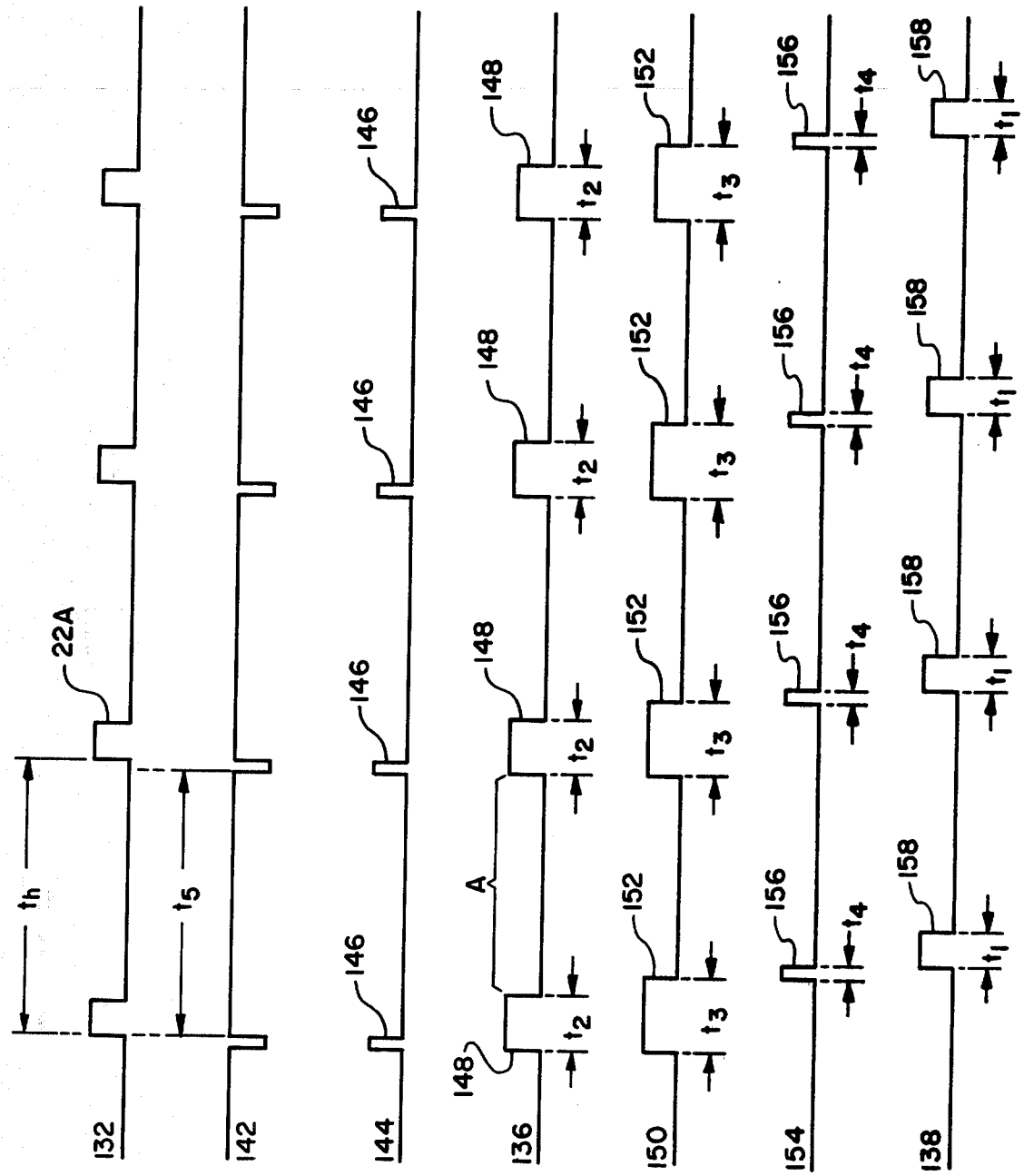
FIG. 10 is a waveform timing chart useful in understanding the operation of the transmitter of FIG. 8.

In addition to scrambling the televised picture by displacing the vertical synchronization signals, scrambling may also be effected by suitably displacing the horizontal synchronizating signals of a standard NTSC television signal from their nominal locations. FIG. 8 illustrates a circuit operable for displacing the horizontal synchronizing signals. In this figure a standard composite video signal, see FIG. 9A, is applied to one input of a delay circuit 128 which is characterized by a delay time of $T_3$. The resulting delayed video signal, see FIG. 9B, together with the undelayed video signal are applied to two inputs of a first electronic switching network 130. The delayed video signal is also supplied to the input of a level slicer 132 which samples the delayed video signal at a level represented by dotted line 134. As a result, the output of level slicer 132 represents the tips of the horizontal synchronization pulses 22 as illustrated in FIG. 10, which pulses are separated in time by the horizontal scanning interval $T_h$. The output of level slicer 132 is applied to the input of a timing network 134 which develops a first output 136 controlling switching network 130 and a second output 138 which controls a second electronic switching network 140. Electronic switching network 140 includes a first input derived from the output of electronic switching network 130 and a second input corresponding to a voltage level representing the tips of the horizontal synchronization pulses 22.

Timing network 134 includes an internal monostable multivibrator or the like adapted for generating a signal 142 characterized by a logic 1 level for a time interval $T_5$ in response to the positive going edge of each pulse developed at the output of level slicer 132, the time interval $T_5$ being chosen to have a selected value less than the horizontal scanning time $T_H$. Signal 142 is inverted to form a signal 144 consisting of a sequence of relatively short duration pulses 146 each having a negative going edge coinciding with a positive going edge of one of the pulses developed at the output of level slicer 132. Another internal positive edge triggered monostable multivibrator or the like is responsive to signal 144 for producing a sequence of pulses 148 on output 136 of timing network 134, each of the pulses 148 having a duration $T_2$ overlapping in time a respective one of the horizontal sync tip pulses produced at the output of level slicer 132. Yet another internal positive edge triggered monostable multivibrator or the like is responsive to pulses 148 for producing a signal 150 consisting of a sequence of pulses 152 each of which has the duration $T_3$, $T_3$ being greater than $T_2$. An internal negative edge triggered monostable multivibrator or the like is responsive to pulses 152 for producing a further signal 154 consisting of a sequence of relatively short duration pulses 156, each of the pulses 156 having a duration $T_4$. A final negative edge triggered monostable multivibrator or the like is responsive to pulses 156 for producing the output on line 138, which output consists of a sequence of pulses 158 each having a time duration $T_1$. As will be explained in further detail hereinafter, electronic switching networks 130 and 140 are responsive to the timing signals developed on outputs 136 and 138 of timing network 134 for combining the undelayed composite field signal (FIG. 9A), the delayed composite field signal (FIG. 9B) and the sync tip voltage level so as to produce an output signal (see FIG. 9C) in which the positions of a nominal horizontal synchronizing signal and a video signal patch mutually replace each other. As a result, the horizontal synchronizing signal is displaced to a position previously occupied by the video signal patch to effect a scrambled video signal at the output of electronic switching network 140. This scrambled video signal is amplitude modulated by video modulator 45 on an RF carrier developed by oscillator 46, amplified by power amplifier 47 and then coupled to diplexer 60 for transmission by antenna 62.

FIG. 9C represents the video signal developed at the output of switching network 140, which video signal includes a displaced horizontal synchronizing signal 160. The signal of FIG. 9C is produced as follows.

Initially, electronic switching network 130 is operative for coupling the delayed video signal from delay element 128 (see FIG. 9B) to its output in response to a logically low signal on output 136 of timing network 134 and for coupling the undelayed video signal (FIG. 9A) to its output in response to logically high signal on output 136. In a similar manner, switching network 140 is operable for coupling the output of switching network 130 to its output in response to a logically low signal on output 138 of timing network 134 and for coupling the sync tip voltage level to its output in response to a logically high signal on output 138 of timing network 134. Therefore, for example, prior to delayed horizontal synchronizing pulse 22A the output of switching network 130 follows the delayed video signal of FIG. 9B. Also, the output of switching network 140 follows its input from switching network 130 so that the output waveform of FIG. 9C corresponds to the delayed video waveform of FIG. 9B. Just prior to the rising edge of horizontal synchronizing signal 22A, output 136 goes logically high with output 138 remaining logically low. As a consequence, the video signal of the undelayed video waveform of FIG. 9A coinciding with pulse 148 is coupled to the output of switching network 130 and therefrom to the output of switching network 140. After the occurrence of pulse 148, the output of switching network 130 again follows the delayed video waveform which is also coupled through switching network 140 until the occurrence of pulse 158. Pulse 158 causes switching network 140 to couple the sync tip voltage level to its output for time interval $t_1$ so that a surrogate horizontal sync pulse 160 is produced which is displaced from its nominal position defined by horizontal synchronization pulse 22A. It will thus be seen that the displaced horizontal sync pulse 160 is produced by interchanging the positions of a patch of the video signal (defined by pulse 148) and the delayed horizontal sync pulse 22A.

Figure 11:
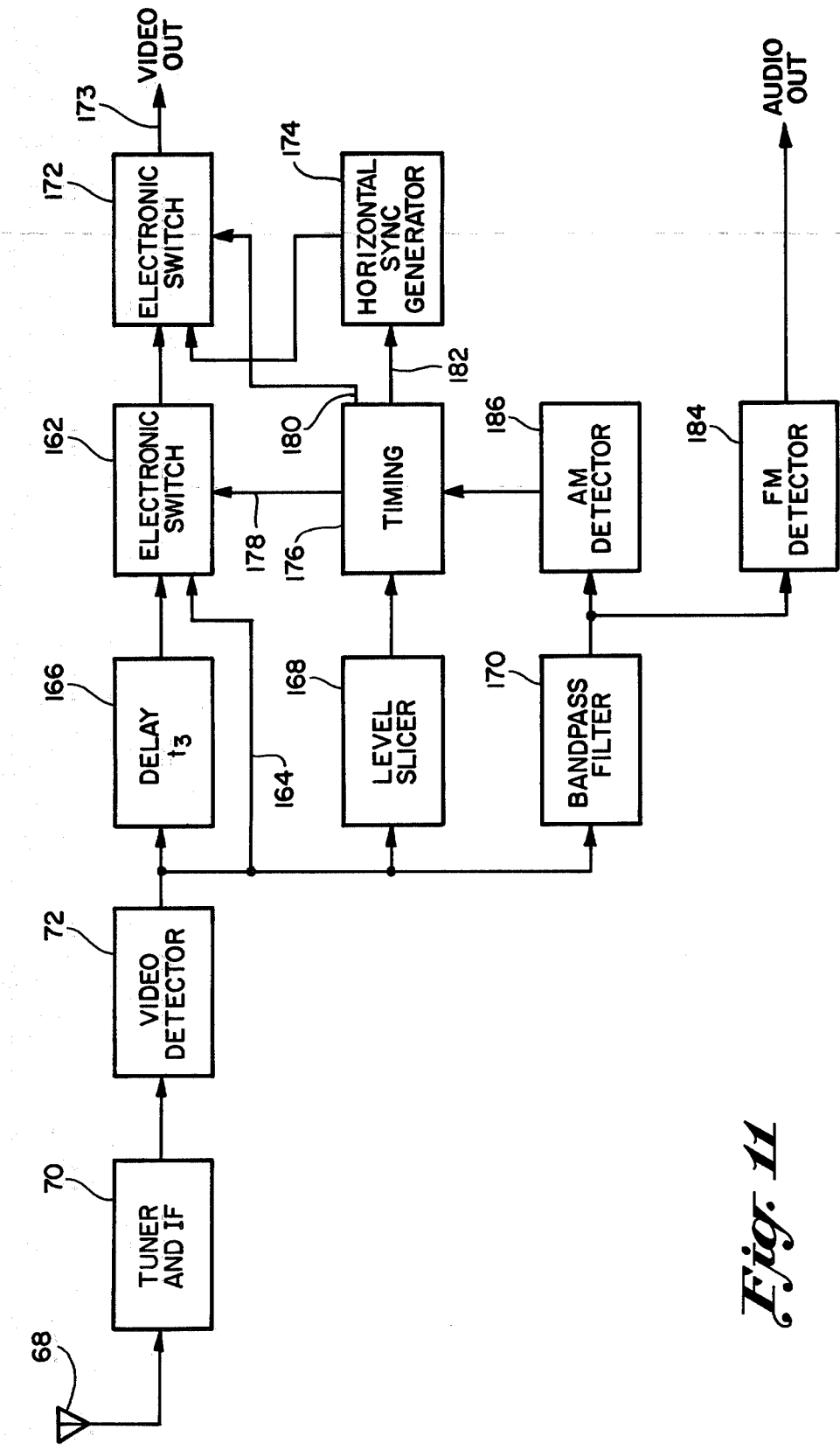
FIG. 11 is a block diagram of a television receiver adapted for re-establishing proper horizontal synchronization information in a received television signal having statically or dynamically displaced horizontal synchronizing signals.

FIG. 11 illustrates a circuit adapted for unscrambling the signal represented by FIG. 9C by re-establishing proper NTSC horizontal synchronization signals. In this circuit, the received RF signal is coupled from antenna 68 through tuner and IF stage 70 and video detector 72 whose output corresponds to the scrambled signal of FIG. 9C. The output of video detector 72 is directly coupled to a first electronic switching network 162 via a conductor 164 and also through a delay element 166, the delay element 166 being characterized by a delay time of $t_3$. In addition, the output of video detector 72 is coupled to a level slicer 168 and to a 4.5 MHz bandpass filter 170. The output of switching network 162 is coupled to one input of a second switching network 172, the second input to switching network 172 being derived from the output of an NTSC horizontal synchronization signal generator 174. The output of level slicer 168, which samples the output of video detector 72 at level 134, is coupled to the input of a timing circuit 176 whose outputs 178, 180 and 182 control switching networks 162 and 172 and horizontal synchronization generator 174. The output of bandpass filter 170 is coupled to a conventional FM detector 184 whose output represents the baseband audio signal and to an AM detector 186 whose output is connected to timing circuit 176.

With reference to FIG. 9D, which represents the output of delay element 166, timing citcuit 176 is responsive to level slicer 168 for developing a series of output timing signals operating switching networks 162 and 172 and horizontal sync generator 174 for combining the waveforms of FIGS. 9C and 9D so as to re-establish the properly synchronized signal of FIG. 9B at the output of switching network 172. In particular, prior to horizontal synchronization pulse 22A, switching networks 162 and 172 are operated for coupling the undelayed output of video detector 72 (FIG. 9C) to output conductor 173. Horizontal sync generator 174 is operated in response to a timing signal developed in coincidence with the leading edge of horizontal synchronization pulse 22A for developing an output horizontal synchronization pulse, switching network 172 being simultaneously operated for coupling this pulse to output conductor 173 whereby a properly located horizontal synchronization pulse is inserted in the output waveform. In response to a subsequent timing signal coinciding with the trailing edge of horizontal synchronization pulse 22A, electronic switching network 172 is operated for again coupling the output of switching network 162 (FIG. 9C) to output conductor 173 for developing the video signal occurring immediately after horizontal synchronization pulse 22A. At time interval $t_3$ thereafter, switching network 162 is operated for coupling the output of delay element 166 (FIG. 9D) to its output, switching network 172 coupling this signal to output conductor 173. As a result, the video patch is developed on the output conductor. It will be noticed that this video patch somewhat overlaps the video segment occurring immediately after horizontal sync pulse 22A. As a result, switching transients are avoided by allowing the video signal at the transition to fade in. After the video patch of FIG. 9D has been completed, switching networks 162 and 172 are again operated for coupling the undelayed output of video detector 72 (FIG. 9C) to output conductor 173 to complete the waveform. It will thus be observed that the video patch has replaced the displaced horizontal pulse 160 and that a properly located horizontal synchronization pulse has been inserted in the output waveform.

As in the case of vertical sync displacement, it may be desired to dynamically vary the position of the displaced horizontal synchronization pulse 160. This can be conveniently accomplished in the transmitter of FIG. 8 by suitably changing the characteristics of timing network 134. In order to restore the proper horizontal synchronization signals an output of timing network 134 amplitude modulates the FM sound carrier to provide a keying signal reflecting the proper location of the horizontal synchronization signals. This keying signal is detected by AM detector 186 of FIG. 11 and applied to timing network 176 so that the proper NTSC horizontal synchronization signals can be re-established at the proper locations.

The keying signal may be either directly related to the time for reinsertion of the correct sync pulse or may be encoded in a manner requiring further processing. The former approach reduces cost while the latter enhances the security of the scrambling system by requiring a more sophisticated receiver.

The foregoing discussion applies directly to a monochrome signal. In the case of a color signal the 3.58 MHz color subcarrier information must also be displaced and transmitted. One method of accomplishing this is to reduce the amplitude of the displaced horizontal pulse 160 by, for example, five IRE units and superimpose upon it a correctly phased 3.58 MHz color subcarrier reference. Since the duration of the displaced horizontal pulse 160 is much larger than the usual eight cycles of color subcarrier employed in normal NTSC transmissions, amplitude of the superimposed signal can be lower than normal practice. For example, a peak to peak amplitude of five to ten IRE units would suffice. In the receiver, horizontal sync generator 174 would include circuits to generate and insert a correctly phased 3.58 MHz color burst. Such circuits are well known in the art of color receiver and color processing circuit design.

While particular embodiments of the invention have been shown and described. It will be obvious to those skilled in the art that changes and modifications may be made without departing from the invention in its broader aspects. Therefore, the aim in the appended claims is to cover all such changes and modifications as fall within the true spirit and scope of the invention.

What is claimed is:

1. In a television signal transmission and receiving system of the type having transmitting means for developing and transmitting a television signal including nominally positioned horizontal and vertical synchronization signals and means for receiving said transmitted television signal and forming a synchronized video image in response to said nominally positioned synchronization signals, the improvement wherein said transmitting means includes means for replacing each of at least some of said nominally positioned horizontal synchronization signals with a surrogate horizontal synchronization pulse displaced in time therefrom and for inserting a video signal patch in said television signal at each position corresponding to a replaced nominally positioned horizontal synchronization signal, said video signal patch being derived from the portion of said television signal to which said surrogate horizontal synchronization pulse was displaced so as to cause said receiving means to reproduce said television signal in an unsynchronized and scrambled form.

2. The improvement according to claim 1 wherein said means for replacing comprises means for replacing each of at least some of said nominally positioned vertical synchronization signals with a relatively wide surrogate vertical synchronization pulse displaced in time therefrom.

3. The improvement according to claim 1 wherein said means for replacing comprises means for replacing each of said nominally positioned vertical synchronization signals with a relatively wide surrogate vertical synchronization pulse displaced in time therefrom by different amounts during alternate fields of said television signal.

4. The improvement according to claim 1 wherein said means for replacing comprises means for replacing the vertical interval associated with each of at least some of said nominally positioned vertical synchronization signals with a white level signal and a relatively wide surrogate vertical synchronization pulse displaced in time from the associated nominally positioned vertical synchronization signal.

5. The improvement according to claim 4 wherein said receiving means includes means for detecting each of said surrogate vertical synchronization pulses, means responsive to said detecting means for generating a nominally positioned vertical synchronization signal during the vertical interval of a subsequently occurring field of said television signal and means for inserting said generated nominally positioned vertical synchronization signal in the vertical interval of said subsequently occurring field.

6. The improvement according to claim 1 wherein said means for replacing comprises means for replacing each of at least some of said nominally positioned vertical synchronization signals with a relatively wide surrogate synchronization pulse displaced in time therefrom by an amount which changes as a function of time.

7. The improvement according to claim 6 wherein said means for replacing comprises means for generating a keying signal adapted for transmission together with said television signal, said keying signal reflecting said function of time.

8. The improvement according to claim 7 wherein said means for deleting and substituting comprises means for detecting said keying signal, means responsive to said detecting means for generating a nominally positioned vertical synchronization signal during each vertical interval of said television signal and means for inserting each of said generated nominally positioned vertical synchronization signals in the associated vertical interval of said television signal.

9. The improvement according to claim 1 wherein said receiving means includes means for replacing each of said video patches with a nominally positioned horizontal synchronization signal and each of said surrogate horizontal synchronization pulses with a signal corresponding to its associated video patch.

10. In a television signal transmission and receiving system of the type having transmitting means for developing and transmitting a television signal including nominally positioned horizontal and vertical synchronization signals and means for receiving said transmitted television signal and forming a synchronized video image in response to said nominally positioned synchronization signals, the improvement wherein said transmitting means includes means for replacing the vertical interval associated with at least some of said nominally positioned vertical synchronization signals with a white level signal and a relatively wide surrogate vertical synchronization pulse displaced in time from the associated nominally positioned vertical synchronization signal.

11. The improvement according to claim 10 wherein said receiving means includes means for detecting each of said surrogate synchronization pulses, means responsive to said detecting means for generating a nominally positioned vertical synchronization signal during the vertical interval of a subsequently occurring field of said television signal and means for inserting said generated nominally positioned vertical synchronization signal in the vertical interval of said subsequently occurring field.

* * * * *